United States Patent [19]
Balukin

[11] 3,724,912
[45] Apr. 3, 1973

[54] APPARATUS FOR REGULATING BRAKE CONTROL PRESSURE

[75] Inventor: Richard F. Balukin, Pittsburgh, Pa.
[73] Assignee: Westinghouse Air Brake Company, Wilmerding, Pa.
[22] Filed: Jan. 25, 1972
[21] Appl. No.: 220,620

[52] U.S. Cl. .................. 303/16, 137/116.3, 303/54
[51] Int. Cl. ............................................. B60t 15/08
[58] Field of Search ........... 303/3, 13, 15, 16, 52, 54; 137/116.3, 627.5

[56] References Cited

UNITED STATES PATENTS 3,536,089  10/1970  Sarbach ........................ 303/52 X Primary Examiner—Duane A. Reger
Attorney—Ralph W. McIntire, Jr. et al.

[57] ABSTRACT

Apparatus for use with vehicle electro-pneumatic brake systems, said apparatus being characterized by a friction-free self-lapping valve device responsive to opposing control forces reflecting the degree of electrical dynamic braking and the degree of fluid pressure controlling the pneumatic friction braking for automatically maintaining the called-for overall braking effect of the dynamic and friction braking combined, said valve device being operable responsively to variation of dynamic braking effort for automatically maintaining the called-for electro-pneumatic braking relationship by compensatingly varying the degree of delivery fluid pressure for the pneumatic braking system.

6 Claims, 1 Drawing Figure

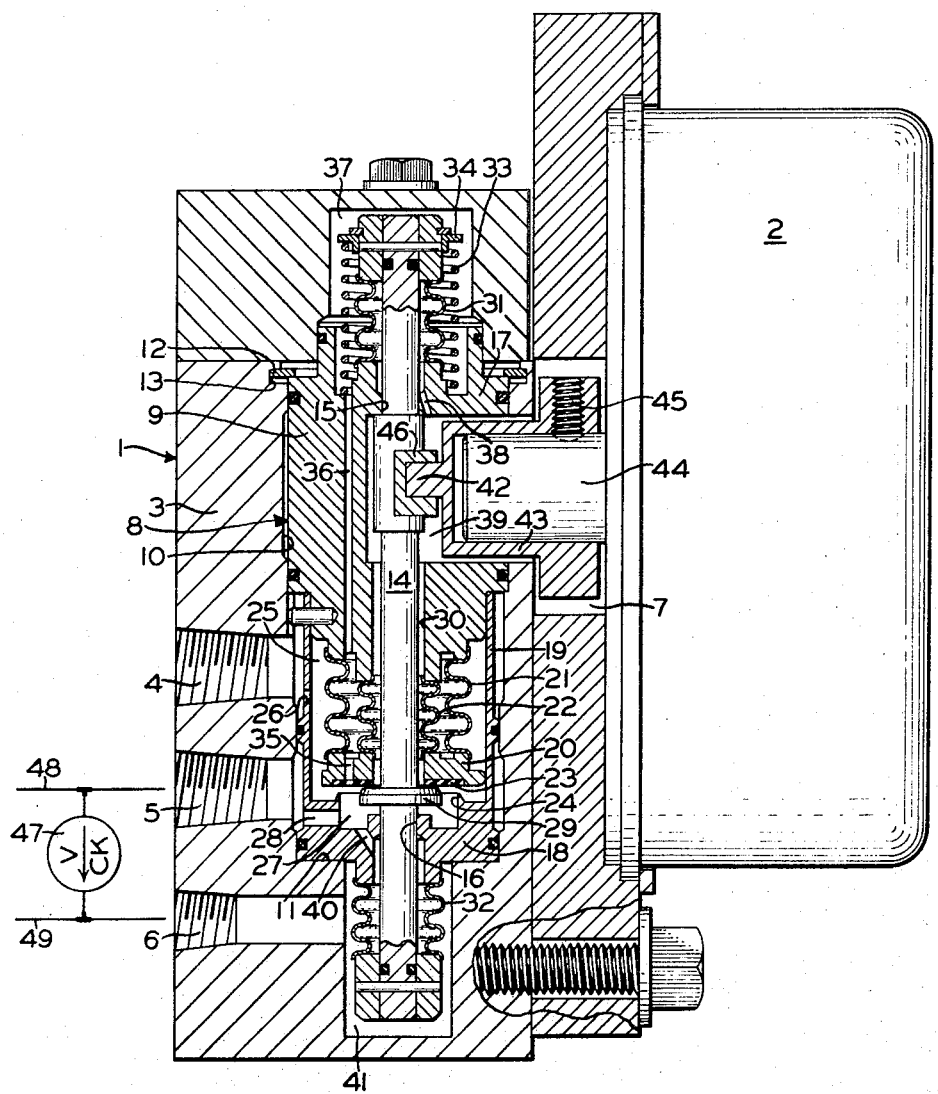

APPARATUS FOR REGULATING BRAKE CONTROL PRESSURE

BACKGROUND OF THE INVENTION

As is well known to those skilled in the art, the initiation of a brake application in an electro-pneumatic brake system normally activates the electric portion of the brake system to provide a dynamic braking action as the primary braking effect at the onset of braking operation. Of course, as the vehicle slows down, the electrical signal output from the wheel generators reduces accordingly as does the dynamic braking effect. When the dynamic braking effect attains a certain low degree, a blending valve device provided in the system automatically actuates the pneumatic or fluid pressure portion of the system to automatically complement the fading dynamic braking with correspondingly increasing fluid pressure friction braking which provides the primary braking effort during the last stages of braking action.

Heretofore the blending or change-over function from dynamic to friction braking has been problematical in that the devices used for this purpose have not been sufficiently sensitive in responding to the electrical signal from the wheel generator as such signal becomes increasingly weaker. As a result of this inefficiency of the blending valve device, the braking action becomes somewhat erratic and inefficient during the blending period until the friction (pneumatic) braking takes over completely.

SUMMARY OF THE INVENTION

The object of the present invention, therefore, is to provide a transducer device characterized by extreme sensitivity of response to electrical signals, including relatively weak signals, for converting said electrical signals to pneumatic or fluid pressure signals either of directly proportional or of inversely proportional values.

The invention resides in an electro-pneumatic transducer or blending valve device capable of providing a continuous blending of dynamic braking effort (compensating voltage) and friction braking effort (delivered pneumatic or fluid pressure) in a straight line relationship. The blending valve device comprises a three-way poppet type balanced check valve, a brushless direct current torque motor, a control bellows type diaphragm, and a regulating bellows type diaphragm. Since both the regulating and control diaphragms have equivalent effective pressure areas, and the balanced check valve is held in lap position by a spring, build-up of delivery pressure follows that of control pressure. Delivery pressure is stabilized by its feedback on the regulating diaphragm, and is variable according to the prevailing force exerted by the torque motor on the three-way valve or by variations of control pressure. The bellows type diaphragms provide a valve structure with a minimum of resistance and, therefore, a maximum of sensitivity responsive to small changes in electrical or pneumatic signals.

The single FIGURE drawing is an elevational view, primarily in section, of an electro-pneumatic transducer device embodying the invention.

DESCRIPTION AND OPERATION

The drawing shows an electro-pneumatic transducer or blending valve device comprising a control valve portion 1 and a brushless direct current torque motor 2.

The control valve portion 1 comprises a casing 3 provided with a supply port 4, a delivery port 5, a control port 6, and an exhaust port 7.

A valve assembly 8 is housed within the casing 3 and comprises a stationary mounting member 9 coaxially secured in said casing in a stepped bore 10, with the lower end of said mounting member resting against a shoulder 11 formed adjacent the lower end of said stepped bore. A snap ring 12 cooperating with a groove 13 formed adjacent the upper end of stepped bore 10 serves to secure the mounting member 9 in a fixed position in said stepped bore.

Valve assembly 8 further comprises a valve stem 14 extending coaxially through mounting member 9. The valve stem 14 is guidably supported at opposite ends within guide bores 15 and 16 provided in transverse walls 17 and 18 formed adjacent the upper and lower ends, respectively, of mounting member 9 for permitting limited reciprocable movement of said valve stem.

The lower end, as viewed in the drawing, of the stationary mounting member 9 comprises a hollow cylindrical portion 19 fixed to and extending coaxially from the upper portion of said mounting member with the transverse wall 18 resting on shoulder 11 of casing 3.

A valve member 20 is supported by a pair of radially spaced-apart bellows type diaphragms 21 and 22 of different diameters and concentrically disposed within the cylindrical portion 19, said valve member being provided with an annular valve element 23 adapted for seating on an annular stationary rib type supply valve seat 24 formed within said cylindrical portion adjacent transverse wall 18. The outer peripheral portion of valve element 23 acts as a supply valve in cooperation with supply valve seat 24 for controlling communication between a fluid pressure supply chamber 25, connected to supply port 4 via an opening 26 formed in the wall of cylindrical portion 19, and a fluid pressure delivery chamber 27 connecting with delivery port 5 via a passageway 28 formed in said cylindrical portion.

An exhaust valve member 29 is concentrically and axially fixed on valve stem 14 within delivery chamber 27 and cooperates with the inner peripheral portion of valve element 23 acting as a valve seat for controlling communication between said delivery chamber and exhaust port 7 via a fluted bore 30 formed in mounting member 9 and through which said valve stem is reciprocably movable.

The upper end of valve stem 14, as viewed in the drawing, is anchored to the mounting member 9 by an upper bellows type diaphragm 31 secured to said upper end of the valve stem and to the upper end of said mounting member, while the lower end of said valve stem is similarly anchored to the lower end of cylindrical portion 19 of said mounting member by a lower bellows type diaphragm 32 of similar dimension as diaphragm 31, thus permitting axial movement of said valve stem in opposite directions, said upper and lower diaphragms being identical in structure. A spring 33 encircling the upper diaphragm 31 is compressed between the upper end of mounting member 9 and a flanged collar 34 secured on the upper end of valve stem 14.

Spring 33 is normally effective for biasing valve stem 14 upwardly until exhaust valve 29 is seated on valve element 23, while the combined downwardly directed inherent compressive force of the bellows type diaphragms 21 and 22, relative to the upwardly directed force of said spring, is effective for moving said valve element, with the exhaust valve seated thereagainst, into seating engagement with valve seat 24, such simultaneous disposition of said exhaust valve and said valve element in their respective seated positions thus defining the lap position of the valve assembly. It should be evident that, in the absence of any fluid pressures acting on the several diaphragms and of any other forces acting on valve stem 14, the biasing force of spring 33 must necessarily be slightly less than the combined oppositely acting forces of diaphragms 21 and 22 in order to maintain the lapped condition of the valve assembly 8.

Valve member 20 has a passageway 35 extending axially therethrough, while mounting member 9 has a passageway 36 extending longitudinally therethrough, said passageways being so disposed as to communicate delivery chamber 27, via the annular space included between diaphragms 21 and 22, with a feedback chamber 37 adjacent the upper end of said mounting member and in which diaphragm 31 and spring 33 are disposed.

A passageway 38 communicates the inner volume of diaphragm 31 with an atmospheric chamber 39 open to atmosphere via port 7, and a passageway 40 connects the inner volume of diaphragm 32 with delivery chamber 27 for reasons to be set forth hereinafter. The valve device 1 is constructed such that the effective pressure area of exhaust valve 29 over which fluid pressure in delivery chamber 27 is effective, is equivalent to the effective pressure area of diaphragm 32 over which such delivery chamber pressure is effective, so that the opposing effects on the two respective pressure areas are always in a balanced state.

In considering the operation of the apparatus embodying the invention, operation of the valve portion 1 alone will be considered first, then will later be considered in conjunction with the torque motor 2. It will also be assumed that there is no fluid pressure at delivery port 5 or control port 6, but that supply fluid pressure is present at supply port 4 and, therefore, in supply chamber 25 also. Since, in the lap condition, valve element 23 is seated on supply valve seat 24, however, supply pressure from supply chamber 25 cannot flow to delivery chamber 27.

If control pressure is established via control port 6 in a control chamber 41 adjacent the lower end of valve stem 14 and diaphragm 32, such control pressure acting on the effective pressure area of said lower end of said valve stem, is effective for disrupting the balanced or lapped condition of the valve assembly 8 and, therefore, causing upward movement of valve stem 14 to a pressure-increasing position in which valve element 23 is unseated from valve seat 24.

With valve element 23 in an unseated or supply position relative to valve seat 24, in which it is shown in the drawing, pressurized fluid may flow from supply chamber 25, past said unseated valve element, and through delivery chamber 27 to delivery port 5. At the same time pressurized fluid from supply chamber 25 also flows through passageways 35 and 36 to feedback chamber 37 to act on the exposed area of the upper end of valve stem 14. When the force of fluid pressure in feedback chamber 37 acting on the upper end of valve stem 14 equals the force of such fluid pressure in control chamber 41 acting on the lower end of end of said valve stem, the valve stem is caused to move downwardly to a neutral position in which valve element 23 is restored to a seated or cut-off position relative to valve seat 24 for terminating further flow of pressurized fluid to delivery port 5. The relationship of diaphragm 31 to diaphragm 32 and the relationship of diaphragms 21 and 22 to spring 33 are such that a 1:1 ratio is maintained between control pressure and supply pressure. Since exhaust valve 29, during such downward movement of valve stem 14, remains in its closed position, valve assembly 8 assumes its lapped condition, above described, in which the forces acting on the several pressure areas are in a state of equilibrium. For example, passageway 40 opens the inner pressure area of diaphragm 32 to delivery pressure in chamber 27 to balance the force of such pressure acting upwardly on the lower side of exhaust valve 29 over an area equivalent to that area seated on valve element 23, while the unseated portion of said exhaust valve on the upper side thereof is exposed to atmosphere via fluted bore 30 and exhaust chamber 39, as is the inner pressure area of diaphragm 31 via passageway 38. The degree of increase in delivered pressure is determined by the degree of control pressure established in control chamber 41 on a 1:1 ratio, as above noted.

It should be evident to one skilled in the art that a decrease of established pressure in control chamber 41 again disrupts the state of balance of the valve assembly 8 in that pressure acting in feedback chamber 37 becomes effective for causing downward movement of valve stem 14 to a pressure-reducing position in which exhaust valve 29 is operated to an unseated or exhaust position relative to valve element 23. Fluid pressure in delivery chamber 27 and delivery port 5 is exhausted to atmosphere past the unseated exhaust valve 29, via fluted bore 30, exhaust chamber 39 and exhaust port 7. The degree of reduction of delivered pressure in delivery chamber 27 and delivery port 5 is governed by the degree of reduction of control pressure in control chamber 41, and upon attainment of such degree of reduction, the valve assembly 8 once more assumes its lap condition.

By employing the bellows type diaphragms 21, 22, 31, and 32 in the valve assembly 8, friction in the valve assembly is held to a minimum, thus imparting a high degree of sensitivity to the valve structure and providing a valve device operatively responsive to the slightest change in the forces acting on valve stem 14. This characteristic makes the valve device 1 highly suitable for use as a blending valve in an electro-pneumatic brake system above described.

The valve portion 1 and torque motor 2 are cooperatively secured to each other so that an eccentric cam member 42 formed on a sleeve member 43 secured coaxially to a torque output shaft 44 of said torque motor by a set screw 45 projects axially into a bearing 46 secured to the valve stem 14. When eccentric 42 is rotated or angularly displaced out of a normal angular position corresponding to zero current input at torque motor 2 and to the neutral position of valve stem 14, said eccentric, acting through the bearing 46, produces axial movement of valve stem 14. Because of the particular structure of the valve portion 1, that is, the use of bellows type diaphragms 21, 22, 31, and 32 and of disc type valve members 20 and 29, the necessary flow capacity of fluid pressure between the several ports, passageways and chambers can be provided with only a minimum of axial movement of valve stem 14. Hence, rotation of the torque motor shaft 44 can be limited to a maximum angular displacement of ± 15°, a range within which the relationship of the force of the torque motor 2 transmitted to the valve stem 14 remains essentially linear.

Since, as above noted, the valve stem 14 must be restored to its neutral axial position in order to restore valve assembly 8 to its lap condition, it is necessary that eccentric 42 be connected to torque motor 2 by yieldable resilient means (not shown) to permit forceable return of said eccentric to its normal angular position, notwithstanding continued current input, so that said valve stem and said valve assembly may resume their neutral and lap positions, respectively.

With the type of valve structure, as herein described, characterized by a high degree of sensitivity, it should be evident that, with the valve assembly 8 in its lapped condition, a slight change or disturbance of the balanced forces acting on valve stem 14, such as a reduction or increase of control pressure in chamber 41, will cause movement of said valve stem accordingly, as above described, to effect a corresponding change of fluid pressure delivered to delivery port 5. Similarly, any axial force exerted on the valve stem 14 by the eccentric 42 of torque motor 2, also effects a corresponding adjustement of fluid pressure at delivery port 5 until the balance of forces is restored and valve assembly 8 is returned to the lap position.

When valve device 1 is used with torque motor 2 as a blending valve in an electro-pneumatic brake system, a brake application initiated by the operator effects actuation of dynamic braking to establish a preselected maximum current at the torque motor while simultaneously causing the control chamber 41 to be charged with control fluid at a preselected maximum pressure. Control pressure in chamber 41 exerts an upwardly directed force on valve stem 14, while the torque motor 2 is arranged such that torque motor current exerts a downwardly directed force on said valve stem, the maximum current and maximum control pressure being so selected as to produce respective oppositely directed equal forces acting on said valve stem to initially establish a lap condition of the valve assembly 8. With retardation of the vehicle, due to the effect of dynamic braking, and consequent reduction of current at the torque motor 2, the downward force thereof acting on valve stem 14 is accordingly reduced, thereby rendering control pressure in control chamber 41 effective for moving said valve stem upwardly to cause unseating of valve element 23 off supply seat 24. As a result, supply pressure from port 4, in the manner above described, may flow to delivery port 5 and to feedback chamber 37 until the balance of forces and lap condition of valve assembly 8 are restored.

Obviously, a subsequent increase of torque motor current would cause downward movement of valve stem 14 and consequent unseating of exhaust valve 29 to effect venting and reduction of delivery pressure at port 5 until a balanced state of forces and lap condition of the valve assembly 8 are once more restored, as above described.

It should thus be seen that as dynamic braking effect decreases, the valve portion 1 and torque motor 2 operate cooperatively for effecting a compensating increase in pneumatic braking effect, or conversely if dynamic braking effect is increased, pneumatic braking is correspondingly decreased, the result being a smooth blending of dynamic and pneumatic braking actions in maintaining the desired overall braking called for.

In order to provide an inshot delivery pressure, which assures immediate response of pneumatic braking to a reduction in dynamic braking, the several pressure areas and compression rating of spring 33 of valve portion 1 maybe designed and selected such that the maximum torque force of shaft 44 corresponding to maximum dynamic braking is able to effect a reduction of all but a predetermined degree of delivery pressure at port 5 corresponding to a preselected input pressure desired. This limitation of maximum torque output by the torque motor 2 can be accomplished electrically by limiting the maximum voltage of the torque motor, or mechanically by adjusting the lever arm (not shown) controlling the amount of angular displacement of shaft 44 and hence the stroke of eccentric 42. Thus, with maximum dynamic braking effort, a preselected delivery pressure at port 5, such as 10 psi., for example, can be provided. As dynamic braking fades, delivery pressure is increased at a rate inversely proportional to the rate of decrease of torque motor current, thus maintaining a constant retarding force due to the combined blending of the dynamic and pneumatic braking effects. When dynamic braking has terminated, delivery pressure at port 5 is proportional solely to control pressure at control port 6 established by the operator in accordance with desired retardation.

If desired, the valve portion 1 may be arranged with torque motor 2 to provide an electric-to-pneumatic transducer by eliminating control pressure at control chamber 41 and reversing the direction of torque motor force acting on valve stem 14.

If desired, if the valve portion 1 is used solely as a pneumatically operable valve device without the torque motor 2, a one-way check valve device 47 may be arranged, as shown, between a pair of conduits 48 and 49 connected to delivery port 5 and control port 6, respectively, with the direction of flow through said check valve device as shown by the arrow, to provide a more direct and rapid release of delivery pressure from port 5 via conduit 49, the conduit via which control pressure is dissipated when reduced by the operator. This arrangement provides a quicker response to reduction of control pressure in chamber 41.

Having now described the invention, what I claim as new and desire to secure by Letters Patent, is:

1. Fluid pressure control apparatus for use in an electro-fluid pressure control system, said apparatus comprising the combination of:
   a. a casing having a fluid pressure supply port, a fluid pressure delivery port, a fluid pressure control port, and an exhaust port;

b. a self-lapping valve assembly operatively disposed in said casing and including:
  i. an axially movable valve stem,
  ii. valve means carried by said valve stem,
  iii. respective bellows type diaphragms disposed at opposite ends of said valve stem and acting in opposing relation for biasing the valve stem to a neutral position in which said valve means occupies a lap position for closing all communications between the several ports,
c. said valve stem being operable in response to control fluid pressure at a preselected degree provided via the control port and acting on the effective pressure area of the bellows diaphragm at one end of the valve stem, to a first position for operating said valve means to a supply position in which said supply port is communicated with said delivery port for effecting delivery of fluid pressure at a degree corresponding to said preselected degree;
d. passage means communicating said delivery port with the effective pressure area of the bellows diaphragm at the end of said valve stem opposite said one end, said valve stem being restorable to its said neutral position in response to equalization of pressure forces acting on opposite ends thereof and being operable in response to a preselected reduction of control pressure acting on said one end of the valve stem, to a second position for operating said valve means to an exhaust position in which said delivery port is communicated with said exhaust port for effecting a corresponding reduction of fluid pressure at the delivery port and at said opposite end of the valve stem and consequent restoration thereof to its said neutral position; and
e. means for exerting a yieldable and variable axially directed complementary force on said valve stem independently of said control pressure and acting in conjunction therewith for effecting an increase or decrease in the degree of fluid pressure at the delivery port according to the combined effects of said control pressure and said complementary force.

2. Fluid pressure control apparatus, as set forth in claim 1, wherein said bellows diaphragms at the opposite ends of said valve stem are characterized by equal effective pressure areas and equal resiliency ratings.

3. Fluid pressure control apparatus, as set forth in claim 1, wherein the last said means comprises an electrical torque motor for exerting said axially directed force at a degree corresponding to an electrical input impressed thereon.

4. Fluid pressure control apparatus, as set forth in claim 3, wherein the last said means further comprises eccentric means operatively connecting the torque motor to said valve stem and being yieldably angularly displaceable out of a normal angular position for transmitting torque motor force to said valve stem and effecting axial movement of said valve stem.

5. Fluid pressure control apparatus, as set forth in claim 4, wherein angular displacement of said eccentric means is limited to a range within which the relationship of the torque motor force transmitted to the valve stem remains essentially linear.

6. Fluid pressure control apparatus, as set forth in claim 5, wherein said angular displacement of said eccentric means is limited to $\pm 15°$.

* * * * *